United States Patent [19]

Yamamoto

[11] Patent Number: 4,509,016
[45] Date of Patent: Apr. 2, 1985

[54] SIGNAL DETECTING CIRCUIT

[75] Inventor: Kaichi Yamamoto, Zama, Japan

[73] Assignee: Sony Corporation, Tokyo, Japan

[21] Appl. No.: 581,204

[22] Filed: Feb. 21, 1984

Related U.S. Application Data

[63] Continuation of Ser. No. 315,451, Oct. 27, 1981, abandoned.

[30] Foreign Application Priority Data

Oct. 29, 1980 [JP] Japan ............................... 55-151956

[51] Int. Cl.³ .................. H03D 3/00; H03K 5/22; H03K 5/00; H03N 9/62
[52] U.S. Cl. ................................ 328/138; 328/147; 328/151; 358/10
[58] Field of Search .............. 328/138, 140, 147, 151; 358/10, 19, 31; 179/84 VF; 364/485, 486, 487

[56] References Cited

U.S. PATENT DOCUMENTS

| | | | |
|---|---|---|---|
| 3,866,151 | 2/1975 | Tajima et al. ..................... | 328/147 |
| 3,906,377 | 9/1975 | Harris ............................... | 307/231 |
| 4,109,109 | 8/1978 | Molleron ......................... | 179/84 VF |

Primary Examiner—Stanley D. Miller
Assistant Examiner—Timothy P. Callahan
Attorney, Agent, or Firm—Lewis H. Eslinger; Alvin Sinderbrand

[57] ABSTRACT

A signal detecting circuit detects the presence in an input signal of a component of a predetermined frequency $f_p$. The circuit includes a sampling arrangement for sampling the input signal at predetermined times separated by a sampling period $1/f_s$ and providing first, second, and third signal samples. An adding circuit provides a sum signal $A+C$ from the first and third signal samples, and a calculating circuit provides a calculated signal $2B \cos \theta$ from the second signal sample, where $\theta$ is the phase relation of the signal samples $2\pi f_s / f_p$. A comparator provides an output signal when the values of the sum signal $A+B$ and the calculated signal $2B \cos \theta$ are substantially equal, indicating the presence of the component of interest.

11 Claims, 4 Drawing Figures

SIGNAL DETECTING CIRCUIT

This is a continuation of application Ser. No. 315,451, filed Oct. 27, 1981, now abandoned.

BACKGROUND OF THE INVENTION

1. Field of the Invention

This invention relates to signal detecting circuits, and is more particularly directed to a signal detecting circuit for detecting whether an input signal contains a component of a predetermined frequency.

2. Brief Description of the Prior Art

It is the general practice to use a spectrum analyzer to determine what frequency components exist in an input signal. However, a spectrum analyzer is a complex and expensive piece of electronic equipment. Thus, when it is necessary only to determine whether a single particular sinusoidal component is present in an input signal at a particular time, it is preferable to use a simpler, less expensive arrangement than the spectrum analyzer.

For example, in a color television receiver, it is often desirable to determine whether a color subcarrier is present in an input video signal received thereby, for instance, to control a color killer circuit, or to control a luminance/chrominance separator circuit.

OBJECTS AND SUMMARY OF THE INVENTION

Accordingly, it is an object of this invention to provide a signal detecting circuit of simple arrangement which can reliably detect the presence of a signal at a predetermined frequency.

It is another object of this invention to provide a signal detecting circuit which can reliably detect whether an input signal contains a signal component having a special frequency, such as the frequency of the chrominance subcarrier in a video signal.

According to one aspect of this invention, a signal detecting circuit for detecting, in an input signal, the presence of a generally sinusoidal signal of a predetermined frequency $f_p$, comprises an input for receiving the input signal; a sampling arrangement for sampling the input signal and providing first, second, and third signal samples respectively representing the amplitude of the input signal at a first time, at a second time following the first time by a predetermined period $1/f_s$, and at a third time following the second time by the predetermined period $1/f_s$; a summing circuit for calculating the sum of the first and third signal samples and providing a sum signal A+B whose value represents such sum; a calculating circuit for calculating the value $2B \cos \theta$, where B is the amplitude of the second sampled signal and $\theta$ equals $2\pi f_p (1/f_s)$, and providing a calculated signal having a value representing $2B \cos \theta$; and a judging circuit for judging whether the value of the sum signal is substantially equal to the value of the calculated signal, and providing an output signal when such values are substantially equal. Such a judging circuit can include a subtractor circuit provided with the sum signal and the calculated signal, and a comparator provided with the output of the subtractor circuit and also with a small threshold voltage R representing, for example, quantizing errors.

The principles of this invention apply whether the input signal is an analog signal or a digital signal.

The above and other objects, features, and advantages of this invention will become apparatus from the ensuing description of preferred embodiments thereof when considered in conjunction with the accompanying drawings.

DETAILED DESCRIPTION OF THE PREFERRED EMBODIMENTS

Figure 1:
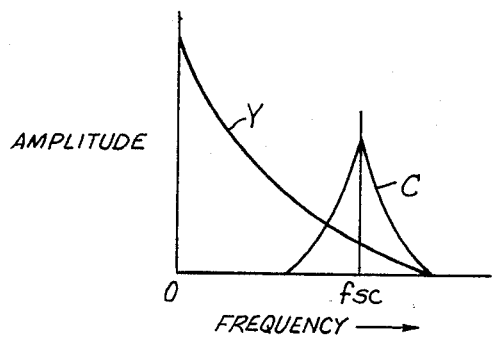
FIG. 1 is a chart showing relative frequency distributions of the luminance component and chrominance component of an NTSC color video signal.

With reference to the drawings, and initially to FIG. 1 thereof, a color video signal according to the NTSC system includes a luminance signal component Y and a chrominance component C sharing the same bandwith. The chrominance component C occupies a relatively smaller frequency band portion centered around the color subcarrier frequency $f_{sc}$, which in the NTSC system is approximately 3.58 MHz. Although in FIG. 1 the luminance component Y stretches across the entire band of the chrominance component C, in reality, the luminance component Y and the chrominance component C are each formed of nodes interleaved with one another. Thus, it is common to use a comb filter as a luminance/chrominance signal separator to separate the luminance and chrominance components Y and C for further processing in a video receiver.

Generally, a comb filter comprises a two-line delay circuit and provides good correlation between each line and the next line adjacent thereto, and thereby provides excellent results in separation of the luminance and chrominance components Y and C. However, the comb filter, because it does impart a two-line delay, lowers the quality of the video signal somewhat. Therefore, if there is not chrominance component C present in the video input signal, it is preferable to disconnect the comb filter and prevent unnecessary signal degradation. To this end, the signal detecting circuit of this invention detects whether there is a significant amount of the color subcarrier $f_{sc}$ present within the video signal, and thus can be used to switch on a luminance/chrominance separator circuit if the color subcarrier is detected to be present. Otherwise, if the color subcarrier component is detected to be less than a threshold level, the luminance/chrominance separator circuit can be switched off.

Figure 2:
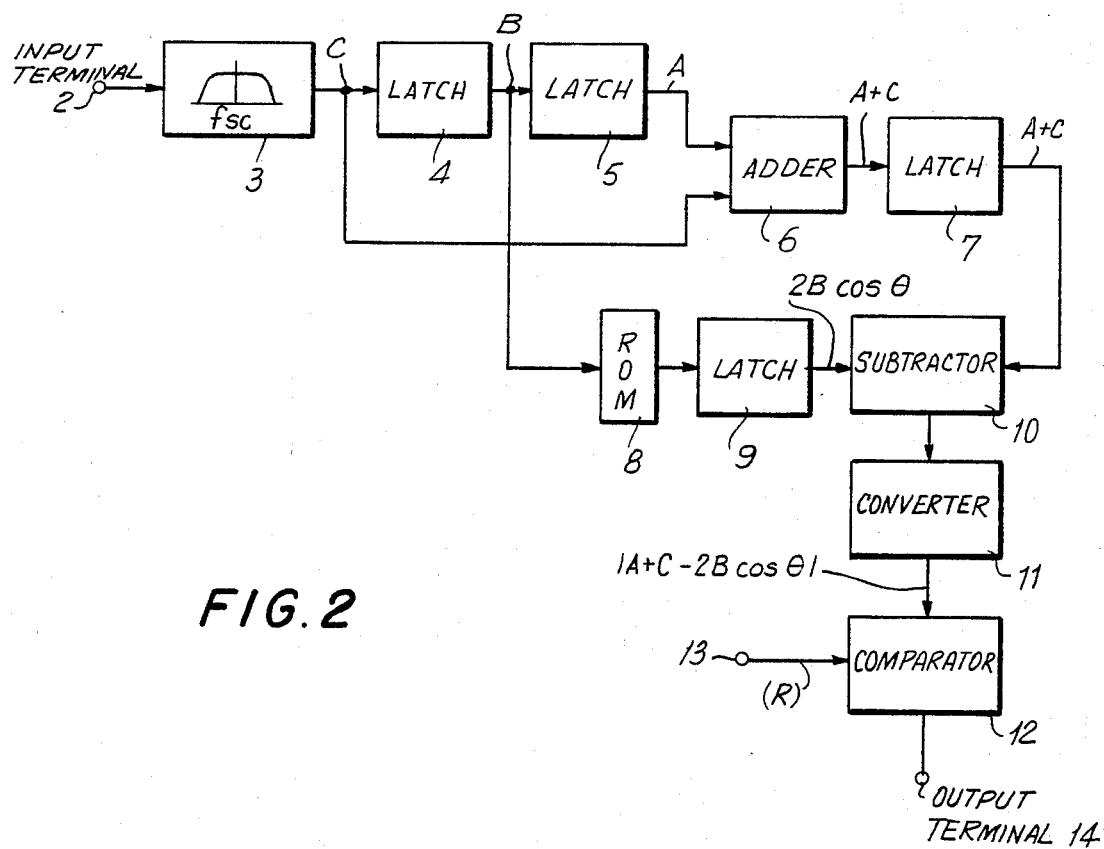
FIG. 2 is a schematic block diagram of a signal detecting circuit according to one embodiment of this invention.

A first embodiment of the signal detecting circuit of this invention is illustrated in FIG. 2.

An input terminal 2 receives an input signal, such as a composite color video signal, and provides the same through a bandpass filter 3, here having as its center frequency the frequency $f_{sc}$ of the color subcarrier, to an input of a latch 4. The latter has an output coupled to an input of another latch 5, whose output in turn is connected to one input of an adder circuit 6. The latches 4 and 5 are operated at a predetermined sampling frequency $f_s$ which is greater than the frequency $f_{sc}$ of the signal to be detected, and preferably is at least $3f_{sc}$. The input of the latch 4 is coupled to another input of the adder circuit 6.

The latches constitute a sampling circuit for sampling the input signal and providing first, second, and third signal samples A, B, and C. These samples respectively represent the amplitude of the input signal at a first time, a second time following the first time by a predetermined period $1/f_s$, and at a third time following the second time by the same predetermined period $1/f_s$.

The adder circuit 6 provides a sum signal $A+C$ which is then sampled by a latch circuit 7 also operated at the sampling frequency $f_s$.

The second signal sample B is furnished to a calculating circuit 8. The latter, in response to the second signal sample B provides calculated signal having a value $2B\cos\theta$, where $\theta=2\pi f_{sc}/f_s$. It should be appreciated that $2\cos\theta$ will be a constant provided the sampling frequency $f_s$ and the subcarrier frequency $f_{sc}$ to be detected are constant. Therefore, the calculating circuit 8 needs to carry out only the function of multiplication.

The calculating circuit 8 is followed by a latch 9 operated at the sampling frequency $f_s$ to hold the calculated signal $2B\cos\theta$. The sum signal $A+C$ and the calculated signal $2B\cos\theta$ are each provided to respective inputs of a subtractor circuit 10, which, in turn, provides an output difference signal $A+C-2B\cos\theta$. A converter circuit 11 converts the difference signal to an absolute value signal $|A+C=2B\cos\theta|$. In this embodiment, the converter circuit 11 reverses the polarity of the difference signal when the difference signal becomes negative, so that the absolute value signal is always zero or greater than zero. The converter circuit 11 can, for example, include a full wave rectifier.

The output of the converter circuit 11 is applied to an input terminal of a comparator 12, and a small reference threshold level R is applied to another input terminal 13 thereof. The comparator 12 provides an output signal which is "1" when the output signal $|A+C-2B\cos\theta|$ of the converter circuit 11 is less than the threshold reference level R, but which is otherwise "0".

The operation of the embodiment of FIG. 2 can be explained with reference to FIG. 3.

Figure 3:
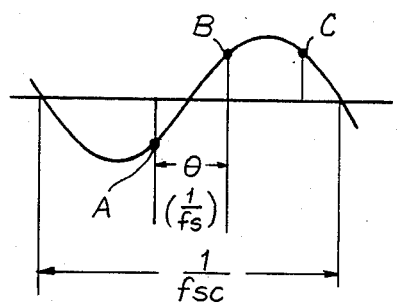
FIG. 3 is a waveform chart for explaining the operation of the circuit of FIG. 2.

As shown in FIG. 3, the three sequentially-sampled signal levels A, B, and C can be considered as points on a sinusoidal waveform and separated from one another by a phase angle $\theta$, where $\theta=2\pi f_{sc}/f_s$. As a consequence, the following equations can be easily derived:

$$A = K \sin 2\pi f_{sc} t \quad (1)$$

$$B = K \sin (2\pi f_{sc} t + \theta) \quad (2)$$

$$C = K \sin (2\pi f_{sc} t + 2\theta) \quad (3)$$

From the foregoing three equations, a general equation can be derived from elementary trigonometry:

$$A + C = 2B \cos \theta \quad (4)$$

The input signal can contain high harmonic frequency components, i.e., $\epsilon K_i \sin (i2\pi f_{sc} t)$.

Nevertheless, as such quantity is common to all of the values A, B, and C, the presence of high harmonic frequency components will not affect the relationship of equation (4).

The subtractor circuit 10, converter circuit 11, and comparator 12 act as judging circuitry for testing whether the input signal applied to the terminal 2 satisfies the relationship of the equation (4). In this embodiment, since there may be some quantizing noise or transmission distortion present, the small reference level R is used. Thus, the comparator (1) provides a "1" at its output 14 when the above equation (4) is substantially satisfied, that is, if the difference between the sum value $A+C$ and the calculated value $2B\cos\theta$ is less than the value of reference threshold level R, and thus is substantially zero.

It should be noted that in the special case where the sampling frequency $f_s$ is exactly four times the subcarrier frequencies $f_{sc}$, then the expression $2B\cos\theta=2B\cos(2\pi/4)=2B\cos 90°$. However, the cosine of 90° is identically zero. Thus, in the special case $f_s=4f_{sc}$, the stages 8, 9, and 10 can be omitted, as is shown in the embodiment of FIG. 4.

Figure 4:
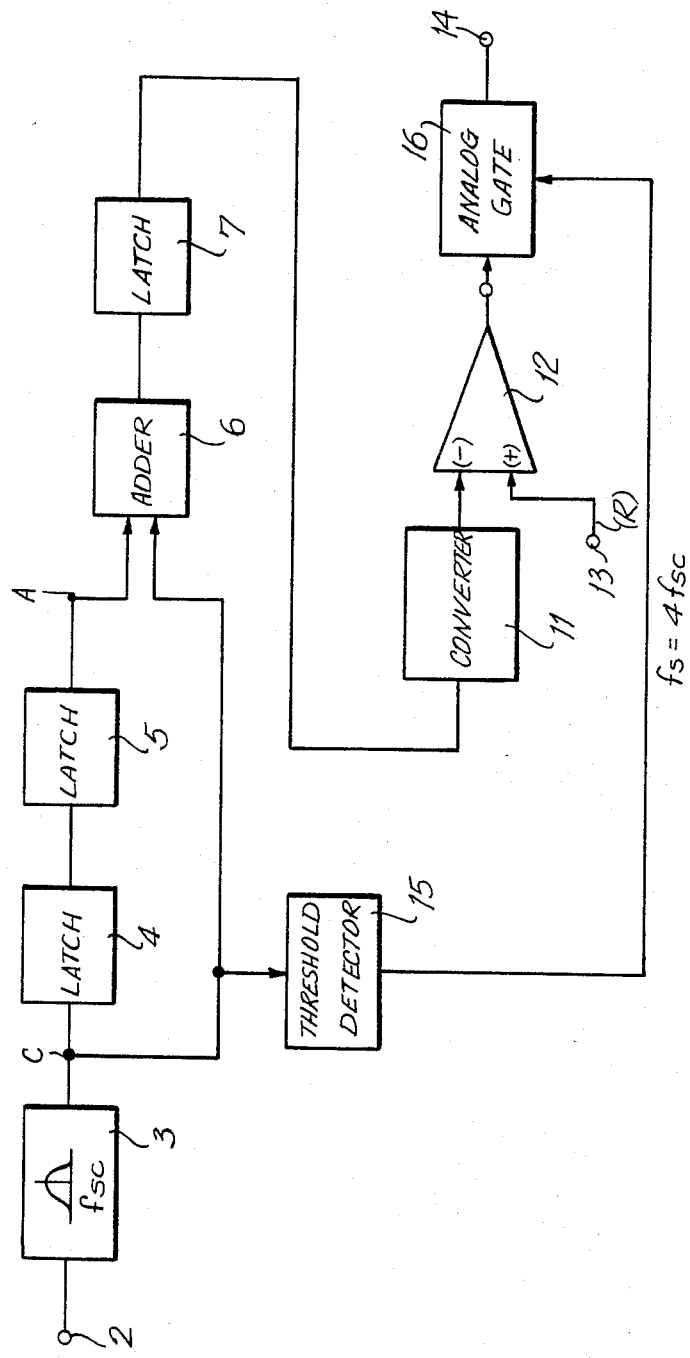
FIG. 4 illustrates another embodiment of this invention.

In FIG. 4, elements identical with those in the embodiment of FIG. 2 bear the same reference numerals, and a detailed description thereof is omitted. In this embodiment, it should be noted that the signal samples A and C are separated in phase by $\pi$ or 180°, that is by a period $1/2f_{sc}$. The latch is coupled directly to the converter circuit 11, which provides the sum signal $|A+C|$ to one input of the comparator 12, here shown as an operational amplifier. Thus, the comparator 12 provides an output which is "1" whenever the absolute value of the sum signal $A+C$ is less than the threshold value R, but is "0" otherwise.

In order to prevent the detecting circuit from providing a false indication when the input signal level is identically zero, a threshold detecter 15 can be provided to detect the strength of the input signal. This threshold detector is then coupled to one input of a gate 16, which then passes the output signal of the comparator to the output terminal 14 only when the input signal is above a threshold level.

While in this embodiment a pair of latches 4 and 5 are used, it should be understood that any number of latches could be connected in cascade between the bandpass filter 3 and the adder circuit 6. The number of such latches then should equal half the ratio of the sampling frequency $f_s$ to the frequency $f_{sc}$ of the chrominance subcarrier, or of the frequency $f_p$ of such other signal as is being detected.

It should be understood that a detecting circuit applying the principles of this invention could be applied either to detect a pure sign wave, or, equally favorably, to detect a sinusoidal component of a complex signal.

While preferred embodiments of this invention have been described in great detail with reference to the drawings, it should be understood that the invention is not limited to those embodiments, and that many modifications and variations will be apparent to those of ordinary skill without departure from the scope or spirit of this invention, which is to be ascertained from the appended claims.

I claim:

1. A signal detecting circuit for detecting in an input signal the presence of a generally sinusoidal signal of a predetermined frequency $f_p$, comprising input means for receiving said input signal;
   sampling means for sampling said input signal and providing first, second, and third signal samples respectively representing the amplitude of said input signal at a first time, at a second time following said first time by a predetermined period $1/f_s$, and at a third time following said second time by said predetermined period $1/f_s$;
   summing means for calculating the sum of said first and third signal samples and providing a sum signal whose value represents said sum;

calculating means for calculating $2B \cos \theta$, where B is the amplitude of said second sampled signal and $\theta$ equals $2\pi f_p(1/f_s)$, and providing a calculated signal having a value representing $2B \cos \theta$;

judging means for judging whether the value of said sum signal is substantially equal to the value of said calculated signal, and providing an output signal when said values are substantially equal.

2. A signal detecting circuit according to claim 1, wherein said input means includes a bandpass filter for passing said predetermined frequency $f_p$.

3. A signal detecting circuit according to claim 1, wherein said sampling means includes first latch means having an input coupled to said input means and an output, and second latch means having an input coupled to the output of said first latch means and an output, with the input of said first latch means and the output of said second latch means providing said third and first signal samples, respectively, and the output of said first latch means providing said second signal sample.

4. A signal detecting circuit according to claim 1, wherein said judging means includes subtractor circuit means provided with said sum signal and said calculated signal and providing a difference signal whose value is the difference between said sum and calculated signals, and comparator means providing said output signal when said difference signal is below a threshold value.

5. A signal detecting circuit according to claim 4, wherein said judging means further includes converter means between said subtractor circuit means and said comparator means for reversing the polarity of said difference signal when said difference signal is one of positive and negative, but maintaining the polarity thereof when said difference signal is the other thereof.

6. A signal detecting circuit according to claim 5, wherein said converter means includes a full wave rectifier.

7. A signal detecting circuit according to claim 1, wherein said input means includes threshold detector means to determine whether said input signal exceeds a predetermined threshold, and said judging means includes gate means coupled to said threshold detector means permitting said output signal to be provided only when said input signal exceeds said threshold.

8. A video signal detecting circuit for detecting in a video input signal the presence of a color subcarrier signal of a predetermined frequency $f_{sc}$, comprising:

bandpass filter means for receiving said input signal and having a center frequency of $f_{sc}$;

sampling means for sampling the output of said bandpass filter means at a predetermined rate $f_s$ such that at least first and second sampled signals are provided separated in time by a period $1/2f_{sc}$;

summing means for calculating the sum of said first and second signal samples and providing a sum signal whose value represents said sum; and judging means for judging whether the value of said sum signal is substantially zero, and providing an output signal when said value is substantially zero to indicate said presence of said color subcarrier signal and hence that the received input signal is a color video signal.

9. A video signal detecting circuit according to claim 8, wherein said sampling means includes one or more latches connected in cascade between said bandpass filter means and said summing means, with each having an input and an output, the input of a first such latch providing said first sampled signal and the output of the last such latch providing said second sampled signal.

10. A video signal detecting circuit according to claim 9, wherein the number of said latches equals half the ratio of said predetermined rate $f_s$ to said predetermined frequency $f_p$, such ratio being an even integer.

11. A video signal detecting circuit according to claim 8, and further including threshold detector means to determine whether said input signal exceeds a predetermined threshold, and wherein said judging means includes gate means coupled to said threshold detector means permitting said output signal to be provided only when said input signal exceeds said threshold.

* * * * *

UNITED STATES PATENT OFFICE
CERTIFICATE OF CORRECTION

Patent No. 4,509,016              Dated April 2, 1985

Inventor(s) Kaichi Yamamoto

It is certified that error appears in the above-identified patent and that said Letters Patent are hereby corrected as shown below:

On page 1, column 2, after line 2, insert

-- FOREIGN PATENTS OR APPLICATIONS
   1,510,859   5/78   Great Britain--

Signed and Sealed this

Eighth Day of October 1985

[SEAL]

Attest:

Attesting Officer

DONALD J. QUIGG

Commissioner of Patents and
Trademarks—Designate